United States Patent

Weingarten

[11] Patent Number: 5,464,064
[45] Date of Patent: Nov. 7, 1995

[54] VALVE PARTICULARLY USEFUL IN FIRE EXTINGUISHING SYSTEMS

[75] Inventor: Zvi Weingarten, Doar Na Oshrat, Israel

[73] Assignee: Bermad, Doar NA Oshrat, Israel

[21] Appl. No.: 172,351

[22] Filed: Dec. 23, 1993

[30] Foreign Application Priority Data

Dec. 25, 1992 [IL] Israel ........................ 104235

[51] Int. Cl.$^6$ .................................................. A62C 35/68
[52] U.S. Cl. ................... 169/22; 251/45; 251/30.05; 137/72
[58] Field of Search ................ 169/20, 22; 251/61.1, 251/45, 30.05; 137/72

[56] References Cited

U.S. PATENT DOCUMENTS

| | | | |
|---|---|---|---|
| 372,219 | 10/1887 | Grinnell | 169/20 |
| 687,148 | 11/1901 | Fortier | 169/22 |
| 2,265,294 | 12/1941 | Lange | 251/30.05 |
| 2,575,469 | 11/1951 | Rider | 169/22 |
| 3,402,732 | 9/1968 | Hardison | 251/45 |
| 4,077,474 | 3/1978 | Hattori | 169/15 |
| 4,245,813 | 1/1981 | Grenier | 251/45 |
| 4,368,782 | 1/1983 | Bray | 169/42 |
| 4,437,611 | 3/1984 | Gilroy | 169/37 |
| 4,793,588 | 12/1988 | Laverty | 251/45 |
| 4,917,294 | 4/1990 | Bergmann et al. | 251/45 |
| 5,188,184 | 2/1993 | Northill | 169/22 |
| 5,263,543 | 11/1993 | Nigro | 169/16 |

Primary Examiner—David M. Mitchell
Assistant Examiner—Gary C. Hoge
Attorney, Agent, or Firm—Benjamin J. Barish

[57] ABSTRACT

This disclosure relates to a valve including a valve member having: a predetermined surface area on its inlet side exposed to the inlet pressure to produce a force tending to move the valve member to an open position; a larger surface area on its opposite, control side exposed to the inlet pressure to produce a larger force tending to move the valve member to its closed position; a passageway through the valve member; a restrictor orifice in the passageway; and a one-way valve in the passageway permitting fluid flow only from the inlet side to the control side of the valve member, to prevent unintentional opening of the valve member in the event of a drop in the inlet pressure followed by the resumption of the inlet pressure.

3 Claims, 1 Drawing Sheet

VALVE PARTICULARLY USEFUL IN FIRE EXTINGUISHING SYSTEMS

FIELD AND BACKGROUND OF THE INVENTION

The present invention relates to valves, and particularly to valves useful in fire extinguishing systems.

One of the dangers in automatically-controlled valves used in fire extinguishing systems is the unintentional operation of the valve, which can result in the accidental flooding of the premises. This can occur in some systems operated by the inlet water pressure when there is a drop, or cut-off, of the inlet water pressure, which can cause the unintentional opening of the valve as soon as the full water inlet pressure is resumed.

BRIEF SUMMARY OF THE INVENTION

According to the present invention, there is provided a valve including a housing having an inlet, an outlet, a passageway connecting the inlet to the outlet, a valve seat in the passageway, a valve member comprising an elastomeric diaphragm movable to an open position or to a closed position with respect to the valve seat, and a control chamber on one side of the valve member for controlling the movements of the valve member. The valve member has a predetermined surface area on its inlet side exposed to the inlet pressure to produce a force tending to move the valve member to an open position; and a larger surface area on its opposite, control chamber side exposed to the inlet pressure to produce a larger force tending to move the valve member to its closed position. The valve member also includes a hollow stem embedded in the diaphragm and formed with a passageway through the valve member leading from its inlet side to the control chamber. A restrictor orifice is formed in the passageway of the hollow stem adjacent to the control chamber, the hollow stem including an extension extending from the restrictor orifice into the control chamber. A one-way valve is provided in the extension permitting fluid flow only from the inlet side to the control side of the elastomeric diaphragm, to thereby prevent unintentional opening of the valve member in the event of a drop in the inlet pressure followed by the resumption of the inlet pressure.

BRIEF DESCRIPTION OF THE DRAWINGS

The invention is particularly useful with valves wherein the valve member is a diaphragm, and is therefore described below with respect to this application.

DESCRIPTION OF A PREFERRED EMBODIMENT

Figure 1:
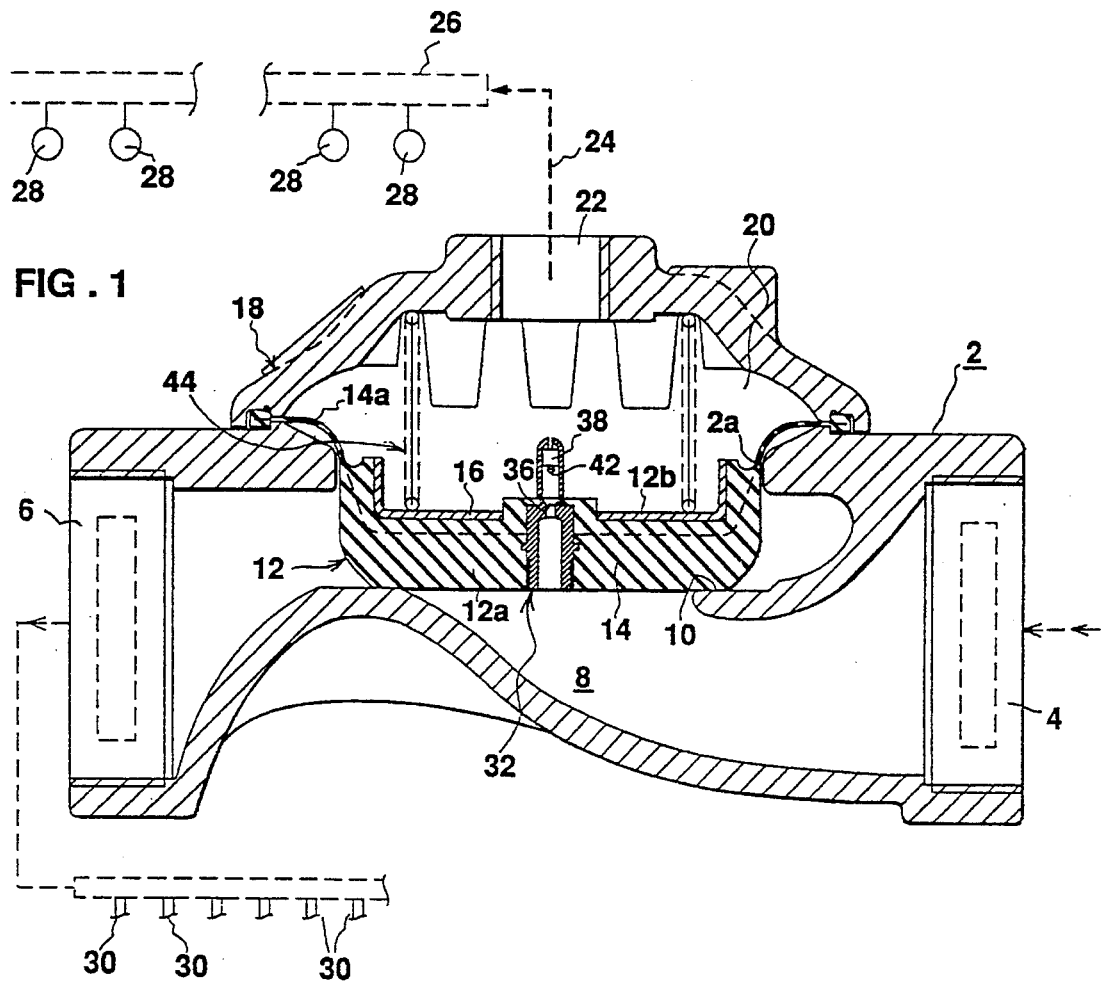
FIG. 1 illustrates one form of valve constructed in accordance with the present invention, as used in a fire extinguishing system.

The valve illustrated in FIG. 1 comprises a housing 2 formed with an inlet 4, an outlet 6, and a passageway 8 circumscribed by a circular valve seat 10 adapted to be opened or closed by a valve member 12. Valve member 12 includes a diaphragm 14 of elastomeric material, and an insert 16 of rigid material, such as metal. Diaphragm 14 is a single unit integrally formed with an outer peripheral section 14a clamped over a circular opening 2a in the housing 2 by a cover 18. This cover defines a control chamber 20 with the diaphragm 14.

Side 12a of the valve member 12 is thus directly exposed to the pressure at the inlet 4 of the valve housing, and the opposite side 12b of the valve member is exposed to the pressure within control chamber 20, which is also at the inlet pressure as will be described below.

The valve is schematically shown in FIG. 1 as used in a fire extinguishing system. In such a system, the cover 18 is formed with a port 22 receiving a pipe 24 connecting the control chamber 20 to a conduit 26. This conduit includes a plurality of fire detectors 28 (e.g., metal meltable by fire), such that if a fire is detected, conduit 26, and thereby the interior of control chamber 20, is vented to the atmosphere. When this occurs, as will be described below, the pressure at the inlet 4 applied to the inlet face 12a of the valve member 12 automatically moves the valve member away from its seat 8, to produce a deluge flow via the valve outlet 6 to a plurality of fire sprinklers 30.

Figure 2:
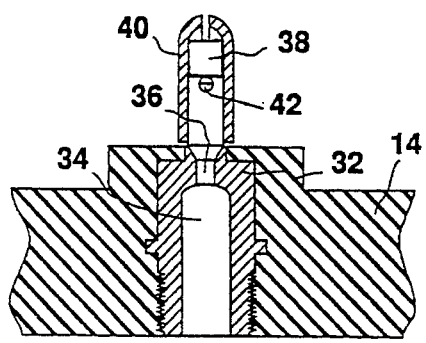
FIG. 2 is an enlarged fragmentary view of a portion of the valve of FIG. 1.

Control chamber 20 is normally pressurized to the inlet pressure by a hollow stem 32, defining a passageway 34 (FIG. 2) through the valve member 12. This passageway includes a restrictor orifice 36 adapted to be closed by a one-way valve member 38. Valve member 38 is freely movable within an extension 40 having an opening 42 within the control chamber 20. Valve member 38 thus permits fluid flow from inlet 4 into the control chamber 20 to pressurize the control chamber, but blocks fluid flow from the control chamber to the inlet 4.

It will be seen that the surface area of the inlet side 12a of valve member 12 exposed to the inlet pressure is that defined by the diameter of the circular valve seat 10; whereas the surface area of the opposite, or control, side 12b of valve member 12 is that defined by the circular opening 2a in the housing 2 covered by the mounting section 14a of the diaphragm 14. Since the cross-sectional area of the control side 12b of the valve member exposed to the inlet pressure within control chamber 20 is larger than the cross-sectional area of the inlet side 12a of the valve member exposed to the inlet pressure, the inlet pressure will normally produce a force tending to close the valve member. A relatively light spring 44 within the control chamber 20 merely keeps the diaphragm 14 spaced away from the cover 18.

During the normal operation of the device, the inlet pressure is applied to the control chamber 20 via orifice 42. Orifice 42 permits the flow from inlet 4 into control chamber 20 to assure equalization of the pressure on opposite sides of the valve member 12. Because of the larger effective surface area of side 12b of the valve member, as compared to its inlet side 12a, the inlet pressure maintains the valve member in the illustrated normally-closed position. If a fire condition is detected by one of the detectors 28, conduit 26 is vented to the atmosphere, thereby venting the interior of control chamber 20 to the atmosphere. As soon as this occurs, the inlet pressure applied to the inlet face 12a of the valve member will automatically open the valve, and thereby produce a deluge flow to the sprinklers 30.

If there should be an unintentional drop, interruption or failure, of pressure at the inlet 4, the one-way valve 38 will seat against the restricted orifice 36 (FIG. 2), and will prevent the drain of the pressure within control chamber 20. Accordingly, this pressure is maintained in the control chamber 20 and will prevent accidental opening of the valve as soon as the inlet pressure 4 is resumed, and thereby an unintentional deluge of water through outlet 6.

While the invention has been described with respect to one preferred embodiment, it will be appreciated that many other variations, modifications and applications of the invention may be made.

What is claimed is:

1. A valve including a housing having an inlet, an outlet, a passageway connecting the inlet to the outlet, a valve seat in said passageway, a valve member comprising an elastomeric diaphragm movable to an open position or to a closed position with respect to said valve seat, and a control chamber on one side of said valve member for controlling the movements of said valve member; said valve member having:

a predetermined surface area on its inlet side exposed to the inlet pressure to produce a force tending to move the valve member to an open position;

a larger surface area on its opposite, control chamber side exposed to the inlet pressure to produce a larger force tending to move the valve member to its closed position;

a hollow stem embedded in said diaphragm and formed with a passageway through said valve member leading from its inlet side to said control chamber;

a restrictor orifice in said passageway of the hollow stem adjacent to said control chamber, said hollow stem including an extension extending from said restrictor orifice into said control chamber;

and a one-way valve in said extension permitting fluid flow only from said inlet side to said control side of the elastomeric diaphragm, to thereby prevent unintentional opening of the valve member in the event of a drop in the inlet pressure followed by the resumption of the inlet pressure.

2. The valve according to claim 1, wherein said extension has a first end adjacent said restrictor orifice, a second end located within said control chamber, and an opening at an intermediate location between said first and second ends; and wherein said one-way valve includes a valve member freely movable within said extension either to said second end to effect communication between said inlet and said control chamber, or to said first end to block communication between said inlet and said control chamber.

3. A system including a valve according to claim 1, a plurality of fire-extinguishing sprinklers, and a plurality of fire detectors, said valve controlling the supply of water to said plurality of fire-extinguishing sprinklers, and said control chamber of the valve being connected to said plurality of fire detectors which vent the control chamber to the atmosphere upon the detection of a fire condition.

* * * * *